United States Patent
Noh et al.

(10) Patent No.: US 9,258,832 B2
(45) Date of Patent: Feb. 9, 2016

(54) METHOD AND DEVICE FOR TRANSMITTING DATA IN WIRELESS COMMUNICATION SYSTEM

(71) Applicant: LG ELECTRONICS INC., Seoul (KR)

(72) Inventors: Min Seok Noh, Anyang-si (KR); Jae Hoon Chung, Anyang-si (KR); Hyun Soo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/350,786

(22) PCT Filed: Oct. 11, 2012

(86) PCT No.: PCT/KR2012/008245
§ 371 (c)(1),
(2) Date: Apr. 9, 2014

(87) PCT Pub. No.: WO2013/055116
PCT Pub. Date: Apr. 18, 2013

(65) Prior Publication Data
US 2014/0254492 A1 Sep. 11, 2014

Related U.S. Application Data

(60) Provisional application No. 61/546,010, filed on Oct. 11, 2011.

(51) Int. Cl.
*H04B 7/204* (2006.01)
*H04W 74/08* (2009.01)
*H04L 5/00* (2006.01)
*H04L 27/26* (2006.01)
*H04L 5/14* (2006.01)

(52) U.S. Cl.
CPC .......... *H04W 74/0833* (2013.01); *H04L 5/0051* (2013.01); *H04L 5/0087* (2013.01); *H04L 5/0094* (2013.01); *H04L 5/0023* (2013.01); *H04L 5/14* (2013.01); *H04L 27/2613* (2013.01)

(58) Field of Classification Search
CPC ............... H04L 5/0007; H04L 27/206; H04L 2012/5608; H04L 5/0051; H04L 5/0094; H04L 5/0087; H04L 27/2613; H04L 5/0023; H04L 5/14; H04J 11/00; H04B 7/2045; H04B 7/208; H04B 7/2621; H04W 84/18; H04W 84/12; H04W 74/0833
USPC .......................... 370/203, 208, 319, 344, 310
See application file for complete search history.

(56) References Cited

U.S. PATENT DOCUMENTS

2009/0046645 A1 2/2009 Bertrand et al.
2009/0204863 A1* 8/2009 Kim et al. ..................... 714/748
(Continued)

FOREIGN PATENT DOCUMENTS

| KR | 10-2011-0008303 A1 | 1/2011 |
| KR | 10-2011-0093721 A | 8/2011 |
| KR | 10-2011-0101087 A | 9/2011 |

*Primary Examiner* — Brenda H Pham
(74) *Attorney, Agent, or Firm* — Lee, Hong, Degerman, Kang & Waimey (57) ABSTRACT

Provided are a method and device for transmitting data in a wireless communication system. A user equipment (UE) transmits uplink data, to a base station, via a physical uplink shared channel (PUSCH) corresponding to a random access response grant, in a UE-specific aperiodic SRS subframe. At said time, the PUSCH is assigned to the entire UE-specific aperiodic SRS subframe.

13 Claims, 7 Drawing Sheets

(56) References Cited

U.S. PATENT DOCUMENTS

| | | | |
|---|---|---|---|
| 2011/0002290 A1* | 1/2011 | Kim et al. | 370/329 |
| 2011/0141941 A1* | 6/2011 | Lee et al. | 370/252 |
| 2012/0039273 A1* | 2/2012 | Nam et al. | 370/329 |
| 2012/0113944 A1* | 5/2012 | Yang et al. | 370/329 |
| 2012/0257582 A1* | 10/2012 | Damnjanovic et al. | 370/329 |
| 2012/0307779 A1* | 12/2012 | Noh et al. | 370/329 |

* cited by examiner

METHOD AND DEVICE FOR TRANSMITTING DATA IN WIRELESS COMMUNICATION SYSTEM

CROSS-REFERENCE TO RELATED APPLICATIONS

This application is the National Stage filing under 35 U.S.C. 371 of International Application No. PCT/KR2012/008245, filed on Oct. 11, 2012, which claims the benefit of U.S. Provisional Application Ser. No. 61/546,010, filed on Oct. 11, 2011, the contents of which are all hereby incorporated by reference herein in their entirety.

BACKGROUND OF THE INVENTION

1. Field of the Invention

The present invention relates to wireless communications, and more particularly, to a method and apparatus for transmitting data in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A UL reference signal may be divided into a demodulation reference signal (DMRS) and a sounding reference signal (SRS). The DMRS is a reference signal used in channel estimation for the demodulation of a received signal. The DMRS may be associated with the transmission of a physical uplink shared channel (PUSCH) or physical uplink control channel (PUCCH). The SRS is a reference signal transmitted from a user equipment (UE) to a base station (BS) for UL scheduling. The BS estimates an UL channel through the received SRS and uses the estimated UL channel in UL scheduling.

Meanwhile, the SRS may be periodically transmitted. Alternatively, when the base station needs transmission of the SRS, the SRS may be aperiodically transmitted by being triggered by the base station. A subframe in which the SRS is configured to be transmitted may be pre-determined. The subframe in which the SRS is configured to be transmitted may be a subframe to which a PUSCH and a PUCCH are simultaneously allocated.

When the PUSCH corresponding to a random access response grant is allocated to a subframe in which an aperiodic SRS is configured to be transmitted, a definite operation of the UE is required.

SUMMARY OF THE INVENTION

The present invention provides a method and apparatus for transmitting data in a wireless communication system. The present invention provides a method for performing a physical uplink shared channel (PUSCH) transmission corresponding to a random access response grant without rate-matching in an aperiodic sounding reference signal (SRS) subframe.

In an aspect, a method for transmitting, by a user equipment (UE), data in a wireless communication system is provided. The method includes transmitting uplink data via a physical uplink shared channel (PUSCH) corresponding to a random access response grant in an UE-specific aperiodic sounding reference signal (SRS) subframe. The PUSCH is allocated to the whole UE-specific aperiodic SRS subframe.

In another aspect, a user equipment (UE) for transmitting data in a wireless communication system is provided. The UE includes a radio frequency (RF) unit for transmitting or receiving a radio signal, and a processor connected to the RF unit, and configured to transmit uplink data via a physical uplink shared channel (PUSCH) corresponding to a random access response grant in an UE-specific aperiodic sounding reference signal (SRS) subframe. The PUSCH is allocated to the whole UE-specific aperiodic SRS subframe.

In another aspect, a method for transmitting, by a user equipment (UE), data in a wireless communication system is provided. The method includes performing rate-matching or puncturing on a physical uplink shared channel (PUSCH) in an UE-specific aperiodic sounding reference signal (SRS) subframe, transmitting uplink data via the PUSCH in the UE-specific aperiodic SRS subframe. The PUSCH does not correspond to a random access response grant or retransmission of the same transport block.

Complexity of blind decoding of the base station can be reduced.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3$^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
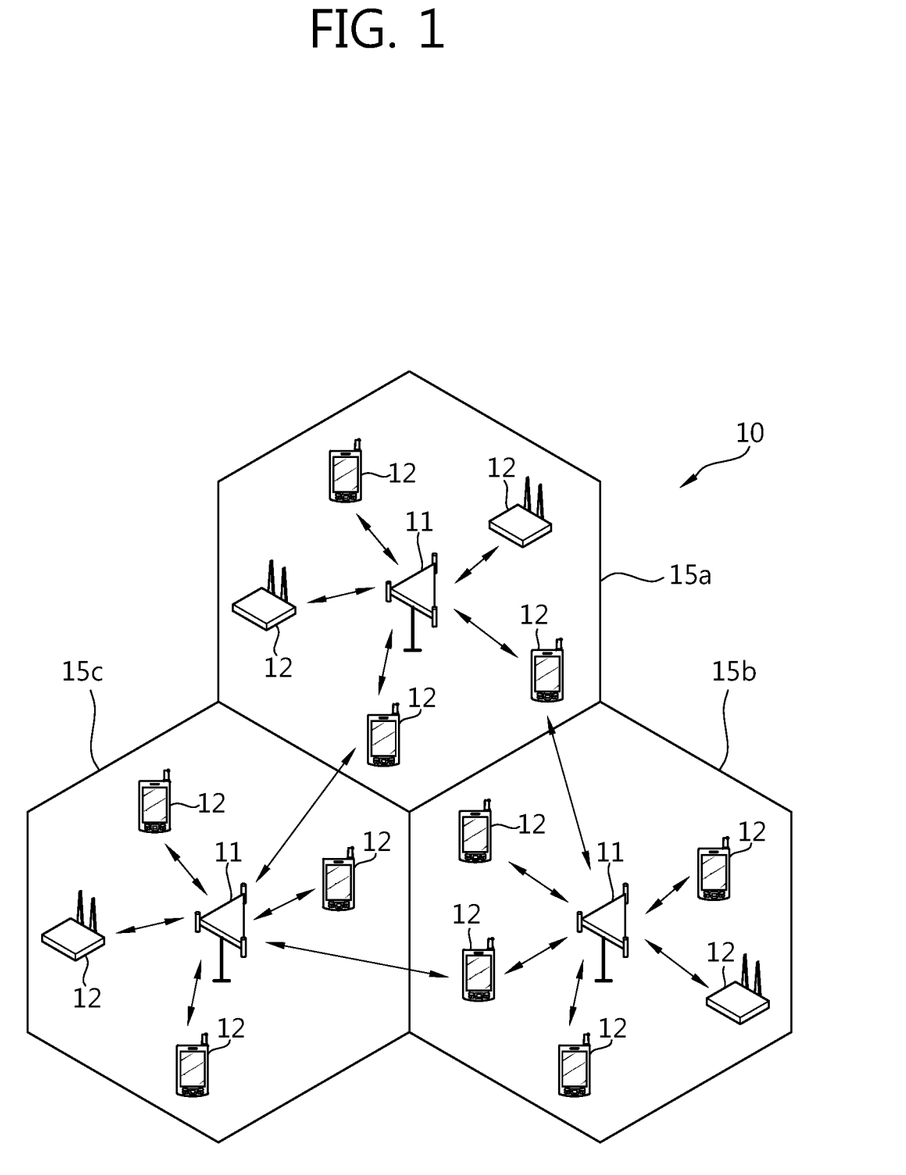
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
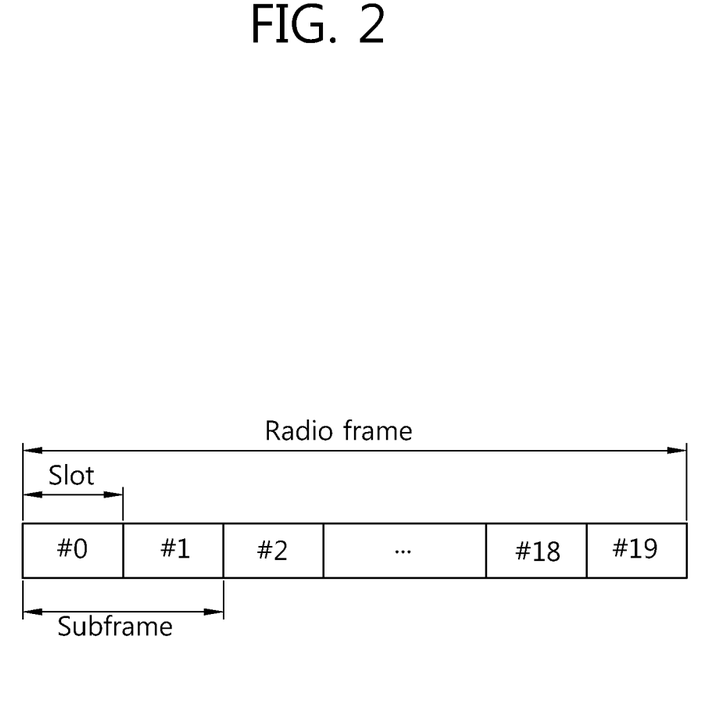
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
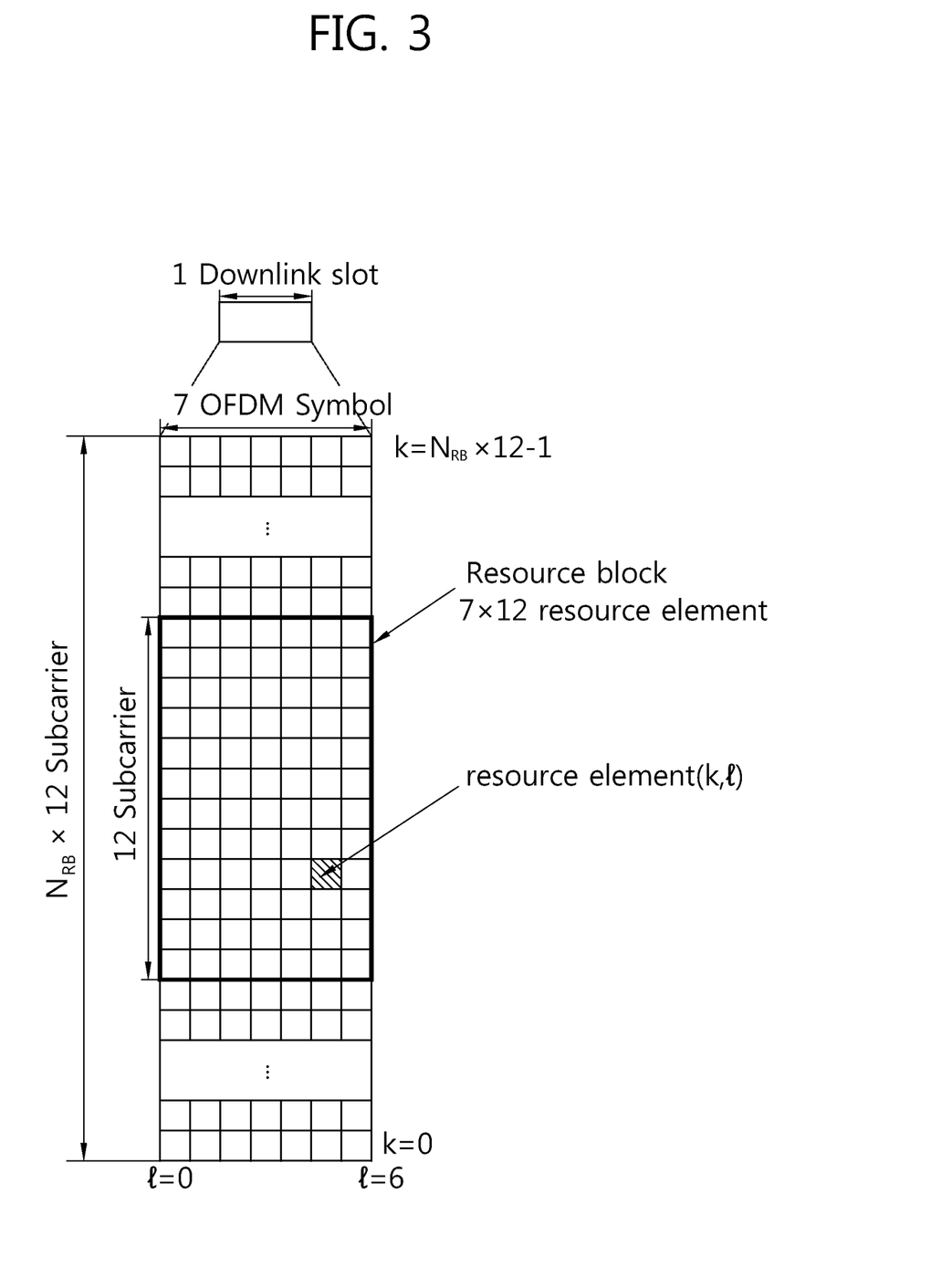
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k ($k=0, \ldots, N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
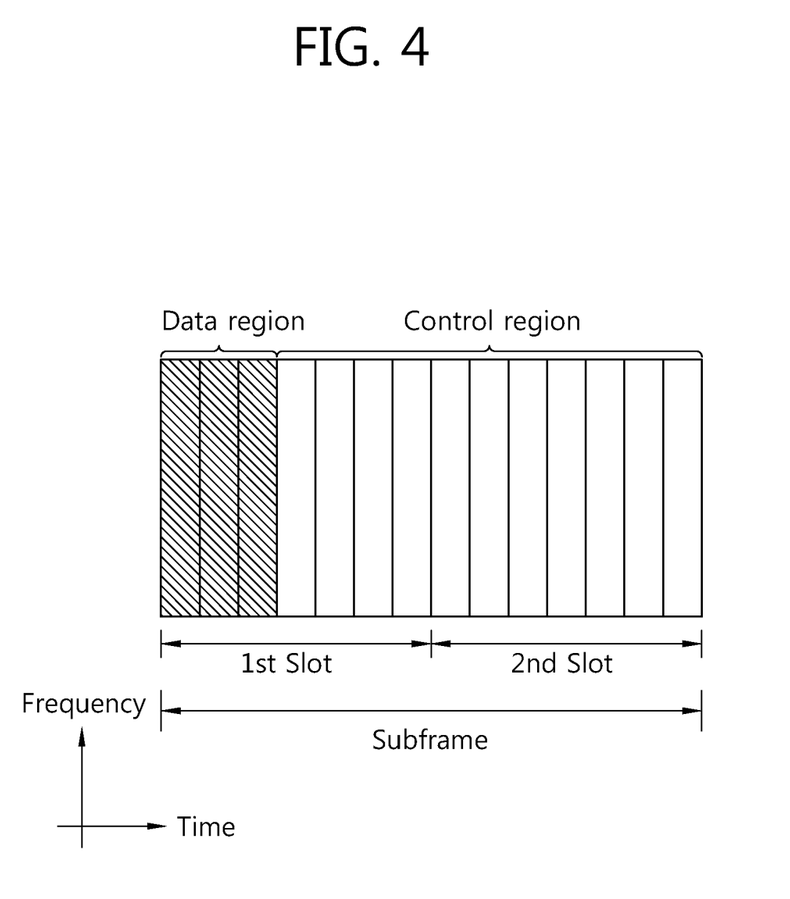
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state.

The BS determines a PDCCH format according to a DCI to be transmitted to the UE, and attaches a cyclic redundancy check (CRC) to the DCI. A unique radio network temporary identifier (RNTI) is scrambled or masked on the CRC according to the owner or the purpose of the PDCCH. In case of a PDCCH for a particular UE, a unique identifier, e.g., a cell-RNTI (C-RNTI), of the UE, may be scrambled on the CRC. Or, in case of a PDCCH for a paging message, a paging indication identifier, e.g., a paging-RNTI (P-RNTI), may be scrambled on the CRC. In case of a PDCCH for a system information block (SIB), a system information identifier, e.g., a system information-RNTI (SI-RNTI), may be scrambled on the CRC. In order to indicate a random access response, i.e., a response to a transmission of a random access preamble of the UE, a random access-RNTI (RA-RNTI) may be scrambled on the CRC.

A restrictive set at the CCE position where the PDCCH may be located may be defined for each UE. The set of the CCE position where the PDCCH of each UE itself may be found is called a search space. The size of the search space is different according to the format of the PDCCH. The search space may be divided into a common search space (CSS) and a UE-specific search space (USS). The CSS is an area where the PDCCH which carries common control information is searched, and is a search area which is commonly configured for all UEs. The CSS is compose of 16 CCEs of CCE indexes 0 to 15, and may support the PDCCH of aggregation levels 4 and 8. However, the DCI format 0/1A which carries UE-specific control information may be transmitted through the CSS. The USS is a dedicated search space for a specific UE. The USS may support the PDCCH of aggregation levels 1, 2, 4, and 8. For one UE, the CSS may overlap with the USS.

The UE blind-decodes a DCI format which is transmitted from the base station. The blind decoding is a scheme of determining whether the PDCCH is the UE's own control channel by checking a CRC error by demasking a desired identifier to the CRC of the received PDCCH. The UE does not know the position where the UE's PDCCH is transmitted within the control region, and the CCE aggregation level or DCI format which is used for the transmission. In order to reduce a calculation burden of the UE's blind decoding, the UE does not need to simultaneously search for all defined DCI formats. Generally, the UE may always search for the DCI format 0/1A in the USS. The DCI format 0 is used for the scheduling of the physical uplink shared channel (PUSCH). The DCI format 1A is used for the scheduling of the PDSCH and for the random access procedure which is initialized by the order of the PDCCH. The DCI format 0/1A may have the same size, and may be distinguished by a flag within the DCI format. Furthermore, the UE may be requested to further receive the DCI format 1/1B/2, etc, in the USS according to the PDSCH transmission mode which is configured by the base station. The UE may search form the DCI format 1A/1C in the CSS. Furthermore, the UE may be configured to search for the DCI format 3/3A, etc, in the CSS. The DCI format 3/3A has the same size as that of the DCI format 0/1A and may be distinguished by having a CRC which has been scrambled by the different identifiers. The UE may perform blind decoding up to 44 times within the subframe according to the transmission mode and the DCI format.

The control region of each serving cell is composed of a set of CCEs whose indexes are 0 to $N_{CCE,k}-1$, and $N_{CCE,k}$ is the total number of CCEs within the control region of subframe k. The UE may monitor the PDCCH candidate set as configured by the higher layer on one or more activated serving cells. At this time, the monitoring is an attempt of respectively decoding the PDCCH within the PDCCH candidate set according to all monitored DCI formats. Search space $S_k^{(L)}$ in aggregation levels 1, 2, 4, or 8 may be defined by the PDCCH candidate set.

Figure 5:
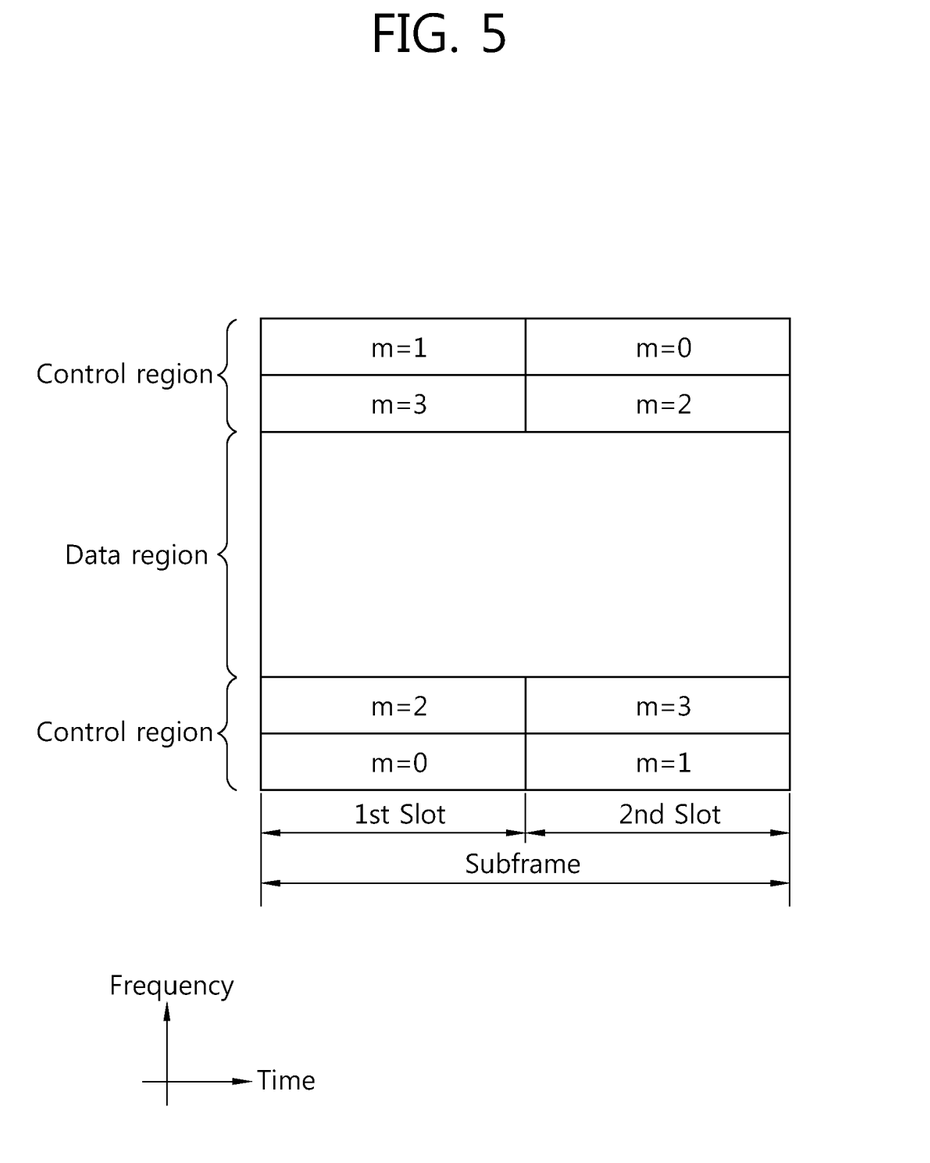
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement (ACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereinafter, an uplink reference signal (RS) will be described.

In general, an RS is transmitted as a sequence. Any sequence can be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Example of the PN sequence include an m-sequence, a computer generated sequence, a Gold sequence, a Kasami sequence, etc. In addition, the RS sequence may be a cyclically shifted sequence.

The uplink RS can be classified into a demodulation reference signal (DMRS) and a sounding reference signal (SRS). The DMRS is an RS used for channel estimation to demodulate a received signal. The DMRS can be combined with PUSCH or PUCCH transmission. The SRS is an RS transmitted for uplink scheduling by a UE to a BS. The BS estimates an uplink channel by using the received SRS, and the estimated uplink channel is used in uplink scheduling. The SRS is not combined with PUSCH or PUCCH transmission. The same type of base sequences can be used for the DMRS and the SRS. Meanwhile, precoding applied to the DMRS in uplink multi-antenna transmission may be the same as precoding applied to the PUSCH. Cyclic shift separation is a primary scheme for multiplexing the DMRS. In an LTE-A system, the SRS may not be precoded, and may be an antenna-specific RS.

The SRS is an RS transmitted by a relay station to the BS and is an RS which is not related to uplink data or control signal transmission. In general, the SRS may be used for channel quality estimation for frequency selective scheduling in uplink or may be used for other usages. For example, the SRS may be used in power control, initial MCS selection, initial power control for data transmission, etc. In general, the SRS is transmitted in a last SC-FDMA symbol of one subframe.

Table 1 and Table 2 represent $T_{SFC}$ which indicates a cell-specific subframe configuration period for SRS transmission and $\Delta_{SFC}$ which indicates a cell-specific subframe offset for SRS transmission.

Table 1 is an example of an SRS subframe configuration in an FDD system.

TABLE 1

| srs-SubframeConfig | Binary | Configuration period $T_{SFC}$ (Subframes) | Offset $\Delta_{SFC}$ (Subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 2 is an example of an SRS subframe configuration in a TDD system.

TABLE 2

| srs-SubframeConfig | Binary | Configuration period $T_{SFC}$ (Subframes) | Offset $\Delta_{SFC}$ (Subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Operations in a UE for SRS transmission is as follows.

A UE shall transmit SRS on per serving cell SRS resources based on two trigger types. Trigger type 0 triggers the SRS based on higher layer signaling. An SRS transmission scheme based on the trigger type 0 is a scheme defined in LTE rel-8, and is a periodic SRS transmission scheme which transmits the SRS periodically according to SRS parameters received by RRC signaling. Hereinafter, the SRS of the trigger type 0 is called a periodic SRS. Trigger type 1 triggers the SRS based on the DCI format. An SRS transmission scheme based on the trigger type 1 is an aperiodic SRS transmission scheme which transmits the SRS if necessary based on a message triggered by the BS dynamically. Hereinafter, the SRS of the trigger type 1 is called an aperiodic SRS. In case both the periodic and aperiodic SRS transmissions would occur in the same subframe in the same serving cell, the UE shall only transmit the aperiodic SRS transmission. The UE may be configured with SRS parameters for the periodic and aperiodic SRS transmission on each serving cell.

The serving cell specific SRS transmission bandwidths $C_{SRS}$ are configured by higher layers. The serving cell specific SRS transmission subframes are configured by higher layers. If the UE is configured with more than one serving cell, the UE is not expected to transmit SRS on different antenna ports simultaneously.

The UE may be configured to transmit SRS on $N_p$ antenna ports of a serving cell where $N_p$ may be configured by higher layer signaling. For PUSCH transmission mode 1 $Np\epsilon\{0,1,2,4\}$ and for PUSCH transmission mode 2 $Np\epsilon\{0,1,2\}$ with two antenna ports configured for PUSCH and $Np\epsilon\{0,1,4\}$ with 4 antenna ports configured for PUSCH. The UE configured for SRS transmission on multiple antenna ports of a serving cell shall transmit SRS for all the configured transmit antenna ports within one SC-FDMA symbol of the same subframe of the serving cell. The SRS transmission bandwidth and starting physical resource block assignment are the same for all the configured antenna ports of a given serving cell.

The UE shall not transmit SRS whenever SRS and PUSCH transmissions happen to coincide in the same symbol.

The UE shall not transmit the periodic SRS whenever the periodic SRS and PUCCH format 2/2a/2b transmissions happen to coincide in the same subframe. The UE shall not transmit the aperiodic SRS whenever the aperiodic SRS and PUCCH format 2a/2b or format 2 with HARQ-ACK transmissions happen to coincide in the same subframe. The UE shall not transmit PUCCH format 2 without HARQ-ACK whenever the aperiodic SRS and PUCCH format 2 without HARQ-ACK transmissions happen to coincide in the same subframe.

The UE shall not transmit SRS whenever SRS transmission and PUCCH transmission carrying HARQ-ACK and/or positive SR happen to coincide in the same subframe if the parameter ackNackSRS-SimultaneousTransmission is FALSE. The UE shall transmit SRS whenever SRS transmission and PUCCH transmission carrying HARQ-ACK and/or positive SR using shortened format happen to coincide in the same subframe if the parameter ackNackSRS-SimultaneousTransmission is TRUE. The UE shall not transmit SRS whenever SRS transmission on any serving cells and PUCCH transmission carrying HARQ-ACK and/or positive SR using normal PUCCH format happen to coincide in the same subframe.

The parameter ackNackSRS-SimultaneousTransmission provided by higher layers determines if the UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell, the UE shall transmit HARQ-ACK and SR using the shortened PUCCH format, where the HARQ-ACK or the SR symbol corresponding to the SRS location is punctured. This shortened PUCCH format shall be used in a cell specific SRS subframe of the primary cell even if the UE does not transmit SRS in that subframe. Otherwise, the UE shall use the normal PUCCH format 1/1a/1b or normal PUCCH format 3 for the transmission of HARQ-ACK and SR.

Table 3 and Table 4 are examples of UE-specific periodic SRS configurations that indicate a periodic SRS periodicity, $T_{SRS}$, and a SRS subframe offset, $T_{offset}$, in a serving cell. The $T_{SRS}$ may be determined as one of $\{2, 5, 10, 20, 40, 80, 160, 320\}$ ms.

Table 3 is an example of a UE-specific periodic SRS configuration in an FDD system.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |

TABLE 3-continued

| SRS Configuration Index $I_{SRS}$ | SRS Periodicity $T_{SRS}$ (ms) | SRS Subframe Offset $T_{offset}$ |
|---|---|---|
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Table 4 is an example of a UE-specific periodic SRS configuration in a TDD system.

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

Table 5 and Table 6 are examples of UE-specific aperiodic SRS configurations that indicate an aperiodic SRS periodicity, $T_{SRS,1}$, and a SRS subframe offset, $T_{offset,1}$, in a serving cell. The $T_{SRS,1}$ may be determined as one of $\{2, 5, 10\}$ ms.

Table 5 is an example of a UE-specific aperiodic SRS configuration in an FDD system.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-31 | reserved | reserved |

Table 6 is an example of a UE-specific aperiodic SRS configuration in a TDD system.

TABLE 6

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |

TABLE 6-continued

| SRS Configuration Index $I_{SRS}$ | SRS Periodicity $T_{SRS}$ (ms) | SRS Subframe Offset $T_{offset}$ |
|---|---|---|
| 15-24 | 10 | $I_{SRS}$ - 15 |
| 25-31 | reserved | reserved |

The UE shall not transmit SRS whenever SRS and a PUSCH transmission corresponding to a random access response grant or a retransmission of the same transport block as part of the contention based random access procedure coincide in the same subframe.

Hereinafter, channel coding of control information is described.

The control information may include channel quality information including CQI and/or PMI, HARQ-ACK and RI, etc. In the description below, it is assumed that the CQI includes the PMI. Different coding rates for the control information are achieved by allocating different number of coded symbols for its transmission. When control data are transmitted in the PUSCH, the channel coding for HARQ-ACK, RI and CQI is done independently.

When the UE transmits HARQ-ACK bits or RI bits, it shall determine the number of coded modulation symbols per layer Q' as follows.

For the case when only one transport block is transmitted in the PUSCH conveying the HARQ-ACK bits or RI bits, the number of coded modulation symbols per layer Q' may be determined by Equation 1.

$$Q' = \min\left(\left\lceil \frac{Z \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \langle \text{Equation 1} \rangle$$

In Equation 1, Z is the number of HARQ-ACK bits or RI bits, $M_{sc}^{PUSCH}$ is the scheduled bandwidth for PUSCH transmission in the current subframe for the transport block, expressed as a number of subcarriers, and $N_{symb}^{PUSCH-initial}$ is the number of SC-FDMA symbols per subframe for initial PUSCH transmission for the same transport block, respectively, given by $N_{symb}^{PUSCH-initial}=(2*(N_{symb}^{UL}-1)-N_{SRS})$. 1) if the UE transmits PUSCH and SRS in the same subframe for initial transmission, or 2) if the PUSCH resource allocation for initial transmission even partially overlaps with the cell-specific SRS subframe and bandwidth configuration defined in Table 1 or Table 2, or 3) if the subframe for initial transmission is a UE-specific aperiodic SRS subframe, $N_{SRS}$ is equal to 1. Otherwise $N_{SRS}$ is equal to 0. $M_{SC}^{PUSCH-initial}$, C and Kr are obtained from the initial PDCCH for the same transport block. If there is no initial PDCCH with DCI format 0 for the same transport block, $M_{SC}^{PUSCH-initial}$, C and Kr shall be determined from the most recent semi-persistent scheduling assignment PDCCH, when the initial PUSCH for the same transport block is semi-persistently scheduled, or, the random access response grant for the same transport block, when the PUSCH is initiated by the random access response grant.

For the case when two transport blocks are transmitted in the PUSCH conveying the HARQ-ACK bits or rank indicator bits, the number of coded modulation symbols per layer Q' may be determined by Equation 2.

$$Q' = \max[\min(Q'_{temp} \cdot 4 \cdot M_{sc}^{PUSCH}) \cdot Q'_{min}] \text{ with} \quad \langle \text{Equation 2} \rangle$$

$$Q'_{temp} = \left\lceil \frac{Z \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil$$

In Equation 2, Z is the number of HARQ-ACK bits or RI bits, $Q_{min}'=0$ if $Z \leq 2$, $Q_{min}'=\text{ceiling}(2Z/Q_m')$ if $3 \leq Z \leq 11$ with $Q_m'=\min(Q_m^1, Q_m^2)$ where $Q_m^x$, $x=\{1,2\}$ is the modulation order of transport block "x", and $Q_{min}'=\text{ceiling}(2Z_1/Q_m')+\text{ceiling}(2Z_2/Q_m')$ if $Z>11$ with $Z_1=\text{ceiling}(Z/2)$ and $Z_2=Z-\text{ceiling}(Z/2)$. $M_{SC}^{PUSCH-initial(x)}$, $x=\{1,2\}$ are the scheduled bandwidths for PUSCH transmission in the initial subframe for the first and second transport block, respectively, expressed as a number of subcarriers, and $N_{symb}^{PUSCH-initial(x)}$, $x=\{1,2\}$ are the number of SC-FDMA symbols per subframe for initial PUSCH transmission for the first and second transport block given by $N_{symb}^{PUSCH-initial(x)}=(2*(N_{symb}^{UL}-1)-N_{SRS}^{(x)})$, $x=\{1,2\}$. 1) If the UE transmits PUSCH and SRS in the same subframe for initial transmission of transport block "x", or 2) if the PUSCH resource allocation for initial transmission of transport bock "x" even partially overlaps with the cell-specific SRS subframe and bandwidth configuration defined in Table 1 or Table 2, or 3) if the subframe for initial transmission of transport block "x" is a UE-specific aperiodic SRS subframe, $N_{SRS}^{(x)}$, $x=\{1,2\}$ is equal to 1. Otherwise $N_{SRS}^{(x)}$, $x=\{1,2\}$ is equal to 0. $M_{SC}^{PUSCH-initial(x)}$, $x=\{1,2\}$, $C^{(x)}$, $x=\{1,2\}$ and $Kr^{(x)}$, $x=\{1,2\}$ are obtained from the initial PDCCH for the corresponding transport block.

When the UE transmits CQI bits, the number of modulation coded symbols per layer Q' may be determined by Equation 3.

$$Q' = \min \quad \langle \text{Equation 3} \rangle$$

$$\left(\left\lceil \frac{(Z+L) \cdot M_{sc}^{PUSCH-initial(x)} \cdot N_{symb}^{PUSCH-initial(x)} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

In Equation 3, Z is the number of CQI bits, L is the number of CRC bits given by 0 when $Z \leq 11$ and 8 otherwise, $Q_{CQI}=Q_m^{(x)}*Q'$ and $\beta_{offset}^{PUSCH}=\beta_{offset}^{CQI}$, where $\beta_{offset}^{CQI}$ depending on the number of transmission codewords for the corresponding PUSCH. If RI is not transmitted then $Q_{RI}^{(x)}=0$.

The variable "x" in $K_r^{(x)}$ represents the transport block index corresponding to the highest $I_{CMS}$ value indicated by the initial UL grant. In case the two transport blocks have the same $I_{CMS}$ value in the corresponding initial UL grant, "x=1", which corresponds to the first transport block. $M_{SC}^{PUSCH-initial(x)}$, $C^{(x)}$ and $Kr^{(x)}$ are obtained from the initial PDCCH for the same transport block. If there is no initial PDCCH with DCI format 0 for the same transport block, $M_{SC}^{PUSCH\text{-}initial(x)}$, $C^{(x)}$ and $Kr^{(x)}$ shall be determined from the most recent semi-persistent scheduling assignment PDCCH, when the initial PUSCH for the same transport block is semi-persistently scheduled, or, the random access response grant for the same transport block, when the PUSCH is initiated by the random access response grant.

In Equation 3, $N_{symb}^{PUSCH\text{-}initial(x)}$ is the number of SC-FDMA symbols per subframe for initial PUSCH transmission for the same transport block. For UL-SCH data information $G=N_L^{(x)}*(N_{symb}^{PUSCH}*M_{SC}^{PUSCH}*Q_m^{(x)}-Q_{CQI}-Q_{RI}^{(x)}$, where $N_L^{(x)}$ is the number of layers the corresponding UL-SCH transport block is mapped onto, $M_{SC}^{PUSCH}$ is the scheduled bandwidth for PUSCH transmission in the current subframe for the transport block, and $N_{symb}^{PUSCH}$ is the number of SC-FDMA symbols in the current PUSCH transmission subframe given by $N_{symb}^{PUSCH}=(2*(N_{symb}^{UL}-1)-N_{SRS})$. 1) If the UE transmits PUSCH and SRS in the same subframe for the current subframe, or 2) if the PUSCH resource allocation for the current subframe even partially overlaps with the cell-specific SRS subframe and bandwidth configuration defined in Table 1 or Table 2, or 3) if the current subframe is an aperiodic SRS subframe, $N_{SRS}$ is equal to 1. Otherwise $N_{SRS}$ is equal to 0.

An aperiodic SRS may be applicable in LTE rel-10 or later. When a PUSCH resource allocation does not overlap with a cell-specific SRS subframe and bandwidth configuration, an LTE rel-8 UE performs PUSCH transmission corresponding to a random access response grant or retransmission of the same transport block as a part of a contention-based random access procedure without performing rate-matching or puncturing on the last SC-FDMA symbol of an UL subframe. However, when a current subframe is a UE-specific aperiodic SRS subframe, the LTE rel-10 UE performs PUSCH transmission by performing the rate-matching or the puncturing on the last SC-FDMA symbol of a corresponding UL subframe. Since the BS cannot distinguish the LTE rel-8 UE from the LTE rel-10 UE, the blind decoding should be performed twice on the assumption of both PUSCH transmission in which the last SC-FDMA symbol is rate-matched or punctured and PUSCH transmission in which the last SC-FDMA symbol is not rate-matched or punctured. That is, in perspective of the BS, the complexity of the blind decoding can be increased.

Hereinafter, a method for transmitting data according to the present invention is described.

When the UE performs PUSCH transmission corresponding to the random access response grant, an LTE rel-10 UE may operate in the same manner as in an LTE rel-8 UE to reduce the complexity of the blind decoding of the BS. That is, although a current subframe is a UE-specific aperiodic SRS subframe, when performing the PUSCH transmission corresponding to the random access response grant or the retransmission of the same transport block, the rate-matching or the puncturing on the last SC-FDMA symbol of a corresponding UL subframe may not be performed. When the PUSCH transmission corresponding to the random access response grant or the retransmission of the same transport block does not overlap with a cell-specific SRS subframe and bandwidth configuration described in Table 1 or Table 2, the UE may perform the PUSCH transmission without performing the rate-matching or the puncturing on the last SC-FDMA symbol of the UE-specific aperiodic SRS subframe.

Accordingly, the last SC-FDMA symbol of the UE-specific aperiodic SRS subframe may be rate-matched or punctured except 1) when the UE transmits the PUSCH and the SRS in the same subframe, or 2) when PUSCH resource allocation partially overlaps with the cell-specific SRS subframe and bandwidth configuration described in Table 1 or Table 2, or 3) when a current subframe is a UE-specific aperiodic SRS subframe and PUSCH transmission corresponding to the random access response grant or retransmission of the same transport block is performed in the current subframe.

Figure 6:
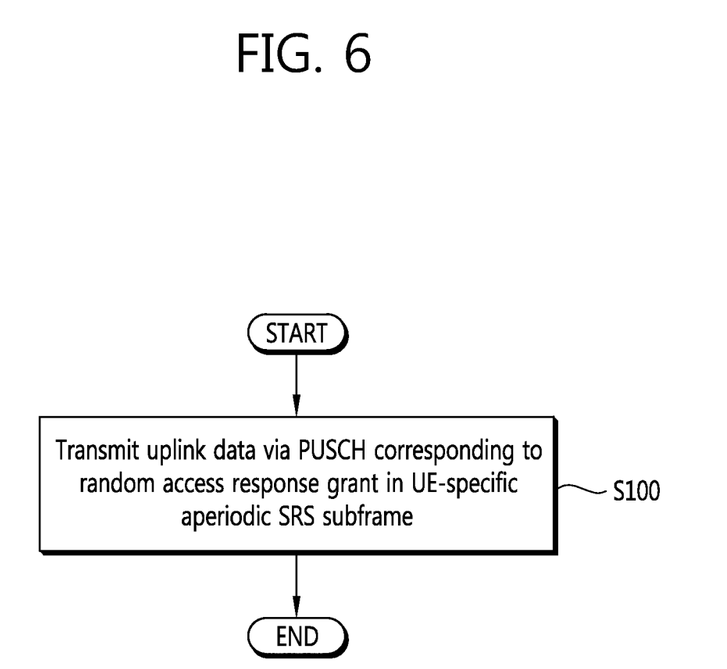
FIG. 6 shows an example of a method for transmitting data according to an embodiment of the present invention.

FIG. 6 shows an example of a method for transmitting data according to an embodiment of the present invention.

In step S100, the BS transmits uplink data via a PUSCH corresponding to a random access response grant in a UE-specific aperiodic SRS subframe. In this case, the last SC-FDMA symbol of the UE-specific aperiodic SRS subframe is not rate-matched or punctured. Further, in this case, resource allocation of the PUSCH does not overlap with the cell-specific SRS subframe and bandwidth configuration described in Table 1 or Table 2.

By the above method, the BS may perform the blind decoding with respect to PUSCH transmission corresponding to the random access response grant or retransmission of the same transport block only once as a part of the contention-based random access procedure. Accordingly, the complexity of the blind decoding of the BS can be reduced.

Figure 7:
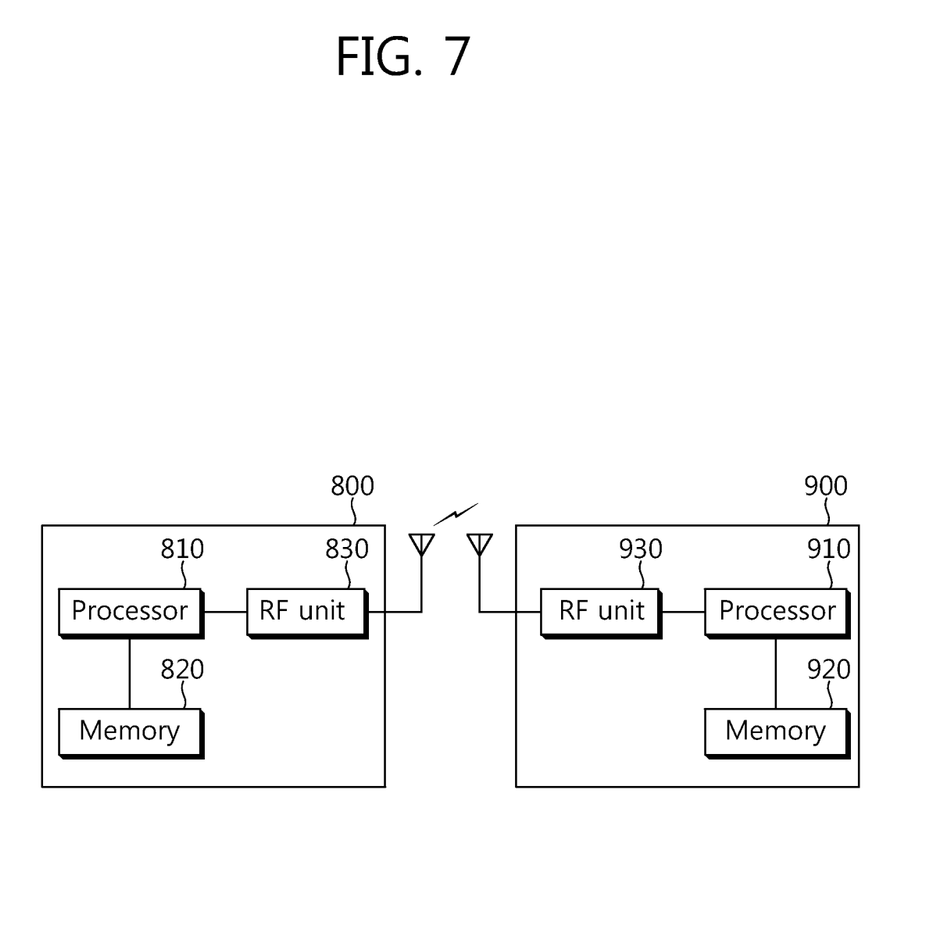
FIG. 7 is a block diagram showing wireless communication system to implement an embodiment of the present invention.

FIG. 7 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), data in a wireless communication system, the method comprising:
    generating uplink data; and
    transmitting the uplink data to a base station via a physical uplink shared channel (PUSCH) allocated to a last single carrier frequency division multiple access (SC-FDMA) symbol in an uplink subframe without puncturing when the uplink data is a response to a random access response grant from the base station and when the uplink subframe is a UE-specific aperiodic sounding reference signal (SRS) subframe.

2. The method of claim 1, wherein the number of the SC-FDMA symbols in the UE-specific aperiodic SRS subframe is determined by a following equation:

$$N_{symb}^{PUSCH}=(2*(N_{symb}^{UL}-1)-N_{SRS})$$

where, the $N_{symb}^{PUSCH}$ denotes the number of SC-FDMA symbols in the UE-specific aperiodic SRS subframe, the $N_{symb}^{UL}$ denotes the number of SC-FDMA symbols in each slot in the UE-specific aperiodic SRS subframe, and $N_{SRS}=0$.

3. The method of claim 1, wherein resources for the PUSCH does not overlap with a cell-specific SRS subframe and bandwidth configuration.

4. The method of claim 1, further comprising:
    transmitting the uplink data to the base station via the PUSCH allocated to the last SC-FDMA symbol in the uplink subframe without the puncturing when the uplink data is based on a retransmitted transport block and when the uplink subframe is the UE-specific aperiodic SRS subframe.

5. The method of claim 1, wherein the base station decodes the uplink data on the PUSCH without consideration of the puncturing the last SC-FDMA symbol on the uplink subframe when the uplink data via the PUSCH corresponds to the random access response grant and when the uplink subframe is the UE-specific aperiodic SRS subframe.

6. A user equipment (UE) for transmitting data in a wireless communication system, the UE comprising:
    a radio frequency (RF) unit for transmitting or receiving a radio signal; and
    a processor connected to the RF unit, and configured to:
        generate uplink data;
        transmit the uplink data to a base station via a physical uplink shared channel (PUSCH) allocated to a last single carrier frequency division multiple access (SC-FDMA) symbol in an uplink subframe without puncturing when the uplink data is a response to a random access response grant from the base station and when the uplink subframe is a UE-specific aperiodic sounding reference signal (SRS) subframe.

7. The UE of claim 6, wherein the number of the SC-FDMA symbols in the UE-specific aperiodic SRS subframe is determined by a following equation:

$$N_{symb}^{PUSCH}=(2*(N_{symb}^{UL}-1)-N_{SRS})$$

where, the $N_{symb}^{PUSCH}$ denotes the number of single carrier frequency division multiple access (SC-FDMA) symbols in the UE-specific aperiodic SRS subframe, the $N_{symb}^{UL}$ denotes the number of SC-FDMA symbols in each slot in the UE-specific aperiodic SRS subframe, and $N_{SRS}=0$.

8. The UE of claim 6, wherein resources for the PUSCH does not overlap with a cell-specific SRS subframe and bandwidth configuration.

9. The UE of claim 6, wherein the processor is further configured to transmit the uplink data to the base station via the PUSCH allocated to the last SC-FDMA symbol in the uplink subframe without the puncturing when the uplink data is based on a retransmitted transport block and when the uplink subframe is the UE-specific aperiodic SRS subframe.

10. The UE of claim 6, wherein the base station decodes the uplink data on the PUSCH without consideration of the puncturing the last SC-FDMA symbol on the uplink subframe when the uplink data via the PUSCH corresponds to the random access response grant and when the uplink subframe is the UE-specific aperiodic SRS subframe.

11. A method for transmitting, by a user equipment (UE), data in a wireless communication system, the method comprising:
    performing rate-matching or puncturing on a physical uplink shared channel (PUSCH) in a UE-specific aperiodic sounding reference signal (SRS) subframe; and
    transmitting, to a base station, uplink data via the PUSCH in the UE-specific aperiodic SRS subframe,
    wherein the PUSCH does not correspond to a random access response grant or retransmission of a transport block, and
    wherein the rate-matching or the puncturing is performed on the last single carrier frequency division multiple access (SC-FDMA) symbol of the UE-specific aperiodic SRS subframe.

12. The method of claim 11, wherein the number of SC-FDMA symbols in the UE-specific aperiodic SRS subframe is determined by a following equation:

$$N_{symb}^{PUSCH}=(2*(N_{symb}^{UL}-1)-N_{SRS})$$

where, the $N_{symb}^{PUSCH}$ denotes the number of single carrier frequency division multiple access (SC-FDMA) symbols in the UE-specific aperiodic SRS subframe, the $N_{symb}^{UL}$ denotes the number of SC-FDMA symbols in each slot in the UE-specific aperiodic SRS subframe, and $N_{SRS}=1$.

13. The method of claim 11, wherein the base station decodes the uplink data on the PUSCH without consideration of the puncturing the last SC-FDMA symbol on the uplink subframe when the uplink data via the PUSCH corresponds to the random access response grant and when the uplink subframe is the UE-specific aperiodic SRS subframe.

* * * * *